Sept. 1, 1931.  V. R. SIVERA  1,821,855
TRIMMING AX
Filed April 6, 1931
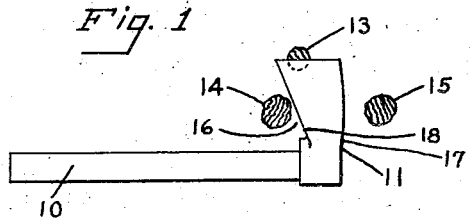
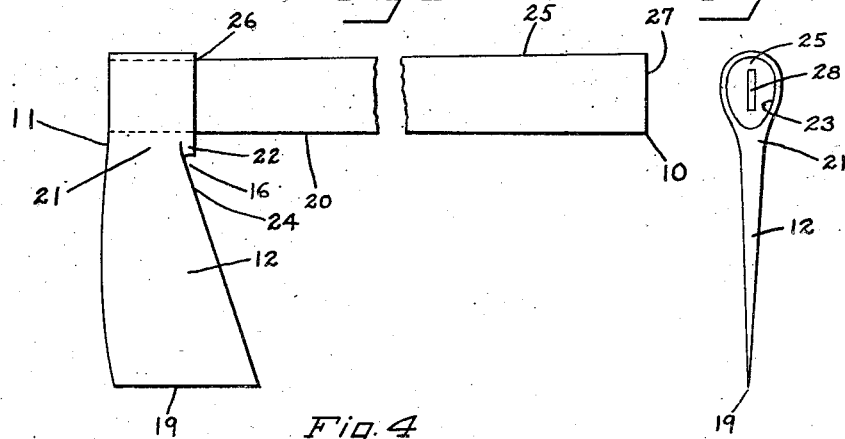
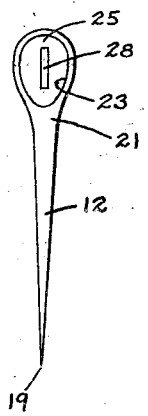
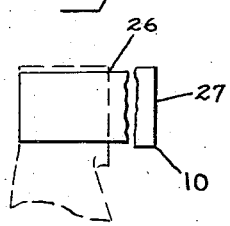
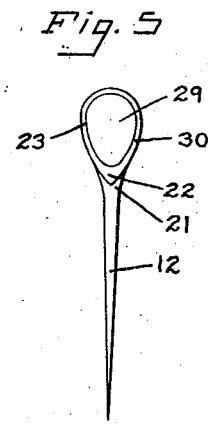
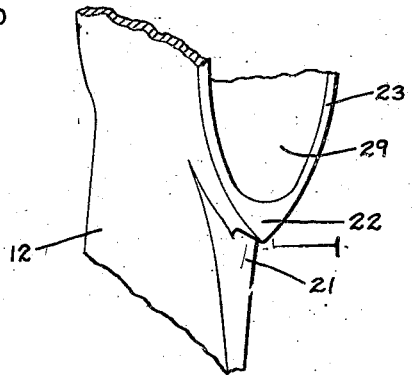
Vincent R. Sivera INVENTOR,
BY Louis M. Schmidt
ATTORNEYS.

Patented Sept. 1, 1931

1,821,855

UNITED STATES PATENT OFFICE

VINCENT R. SIVERA, OF NEW BRITAIN, CONNECTICUT

TRIMMING AX

Application filed April 6, 1931. Serial No. 528,013.

My invention relates to improvements in trimming axes in the form of a tool that is adapted for use in trimming trees, involving severing undesired limbs thereof, and the object of my improvement is to produce a trimming ax that is the form of a special tool for the particular purpose mentioned by reason of the attention given to the details of the elements thereof, including both the handle structure and the head or bit that is mounted thereon and that is adapted to operate efficiently in intricate situations such as is encountered in the way of obstructing limbs that are to be avoided and the like, the tool being designed for effecting the cutting of limbs of the usual run by a single stroke of the ax and by an upward movement.

In the accompanying drawings:—

Figure 1 is a side elevation of my improved trimming ax, represented diagrammatically in position for use, including sections of limbs of a tree being operated upon, including one limb that is to be cut and others adjacent thereto.

Fig. 2 is an enlarged side elevation of the ax, with the handle for the most part broken away.

Fig. 3 is an end elevation of the same.

Fig. 4 is a side elevation of the handle with the middle portion broken away, the position of the head being indicated by broken lines, the two ends being brought together relatively close so as to bring out the difference in the size of the two ends.

Fig. 5 is a view of the head from the inner or rear end.

Fig. 6 is a fragmentary view on an enlarged scale of the throat structure.

My improved trimming ax comprises a handle 10 of wood and a head 11 that can be made as a drop forging, and each of these parts and the two together as a combined structure in all details so far as can be are constructed and arranged for operating efficiently as a tool for one distinct purpose, which is for trimming trees. In this connection consideration is given to what is regarded as the proper manner of effecting such trimming and also of some of the obstacles that are encountered during such tree-trimming operations.

Thus, in probably the first place as regards manner of operation, the cutting is effected from the lower side upwardly as to the direction of the stroke. Also, the limb must be severed by one single blow. Also, usually where trimming is to be effected, there is a plurality of limbs that are closely associated, a condition that accounts for the need or desire to effect the trimming, and these will extend from the trunk at different elevations. In such a condition, it is quite likely that it is one of the uppermost limbs of such a group that should be removed. To permit of the tool effecting this result an elongated blade 12 is provided. Thus the blade 12 may be used to cut a limb 13 that stands higher than other limbs 14 and 15 with which it is relatively closely associated. As shown, the blade 12 is projected between limbs 14 and 15 to reach the limb 13.

The limb 14 is located so that at least a part thereof is directly below part of the upper limb 13. The blade 12 is constructed generally so as to reach around this lower limb 14 to effect the cutting of limb 13.

The blade virtually passes around the lower limb to reach the upper, an operation that is facilitated by having what amounts to a recess 16 in the ax structure adjacent the junction of the blade with the handle, which recess 16 may be said to be located at the throat of the ax. That is to say, the width of the blade 12 between the bottom 18 of the recess 16 and the front edge 17 is reduced relatively to the width as measured along the length of the sharpened cutting bit-edge 19.

The structure shown is the middle or medium of three sizes; is designed for use with one hand only; has a width at the throat of about one and five-eighths inches; has a bit-edge length of about four and one-eighth inches; and may have a blade length full and clear from the bottom edge 20 of the handle 10 outwardly to the bit-edge 19 of six and one-fourth inches.

The throat structure 21 is reinforced by a lug 22 of V-shape that projects downwardly or outwardly from the handle-socket structure 23; that forms generally the upper wall of the throat recess 16; and that merges with the rear edge portion 24 of the blade head 11. That is to say, said lug 22 is V-shaped generally as viewed from the rear.

There would be only slight deviations from these dimensions for the other two sizes. For the smaller size the bit length might be reduced to four inches and the structure made lighter. For the larger size the bit length would be only one-eighth of an inch longer, but the parts all would be made heavier and stronger and the handle longer so as to be adapted for use with two hands.

Details of the handle socket 23 and the handle 10 will now be considered.

The handle 10 has an oval or egg-shaped form of cross-section, not elliptical; the heavier side 25 being uppermost or remote from the bit edge 19; has a vertical dimension of about one and one-half inches; has a thickness for the maximum of about one inch; and has a positive though slight taper from the front or socket end 26 towards the rear butt end 27. A wedge 28 of any suitable form may be used to effect a hold in the socket 23. The length may be twenty inches for the medium size.

The taper that I have found desirable and effective is that provided by an increase in the all-round dimensions of the cross-section of about one-thirty-second of an inch of the rear butt end 27 relatively to the cross-sectional dimensions of the front or socket end 26.

The socket-opening 29 is made a close fit for the cooperating portion of the handle 10 so that a slight pressure effected by the use of the wedge 28 will suffice to effect a firm connection.

The structure of the socket 23 is important by reason in part at least of its simplicity; no surplusage of metal being incorporated therein; no hammer head or the like being provided at the top remote from the bit-edge 19. Thus, as shown, there is a plain wall 30 of metal encircling the handle 10; having a generally uniform thickness for the major portion; which thickness may be approximately one-eighth of an inch; the only deviation from which is on the side of the throat recess 16 where it merges with the reinforcing lug 22.

The metal-weight that in some structures is utilized for a hammer-head or other devices for extending the utility of the tool is utilized virtually for extending the length of the blade.

I claim as my invention:—

A one-hand trimming ax structure comprising a head having a socket and a handle of wood fitting by one end in said socket, said head comprising a narrow blade structure that projects in relatively elongated form from said socket with an arcuate outer boundary and terminates in the form of a longitudinally elongated cutting bit-edge, the throat portion of said blade structure being recessed along the rear edge adjacent the junction with said socket to provide clearance for obstructing branches and the like under conditions of use, the rear edge portion of said socket overhanging said recess, a reinforcing lug projecting from said rear edge portion and merging with said rear edge, said handle being of oval form of cross-section and deviating from uniformity in area of cross-section to the extent of an increase in over-all dimensions on all sides of substantially one-thirty second of an inch at the rear end of a length of about twenty inches relatively to such dimensions at the front or socket end, and the wall structure for said socket being confined to a thin uniform thickness extending around the handle portion that is housed therein and merging on the side of the said blade with the thick and narrow inner end portion of said blade and with the said reinforcing lug at the throat portion.

VINCENT R. SIVERA.